United States Patent [19]

Bennett

[11] 4,028,897

[45] June 14, 1977

[54] SOIL STABILIZATION COMPOSITION

[75] Inventor: Donald Alfred Bennett, Nailsworth, England

[73] Assignee: The International Synthetic Rubber Company, Limited, Southampton, England

[22] Filed: June 7, 1976

[21] Appl. No.: 693,929

[30] Foreign Application Priority Data

June 10, 1975 United Kingdom ............. 24806/75

[52] U.S. Cl. ............................... 61/36 C; 166/295; 260/DIG. 14
[51] Int. Cl.² .......................................... E02D 3/12
[58] Field of Search ........................ 61/36 C, 36 D; 260/29.7 GB, 745, 739; 166/295; 117/6

[56] References Cited

UNITED STATES PATENTS

| | | | |
|---|---|---|---|
| 3,503,774 | 3/1970 | Weymouth | 61/36 C |
| 3,677,014 | 7/1972 | Stout et al. | 61/36 C |
| 3,867,986 | 2/1975 | Copeland | 166/295 X |

FOREIGN PATENTS OR APPLICATIONS 1,053,870  1/1967  United Kingdom ............... 61/36 C Primary Examiner—Jacob Shapiro
Attorney, Agent, or Firm—Cushman, Darby & Cushman

[57] ABSTRACT

The invention relates to a soil stabilization composition comprising a rubber latex of solids content at least 40% by weight and a compatible oil which is prepared by admixing the oil and the latex in the presence of additional emulsifier and in the substantial absence of added water. The composition may be applied as such and optionally rotovated into the soil after application. If desired, a bitumen emulsion may be included in the composition.

8 Claims, No Drawings

SOIL STABILIZATION COMPOSITION

This invention relates to a soil stabilisation composition, to a method of preparing such a composition and to a process for stabilising soil and other particulate material using such a composition.

In British Pat. No. 1,007,671 we have described a process for treating the surface of soil or other particulate material which comprises applying to the surface a latex of an oil extended natural or synthetic rubber. One aim of the process is to combat soil erosion and/or to improve the soil texture by providing a layer of stabilised soil which resists soil erosion until such time as seeds sown in the soil prior to or during the treatment have germinated to form a root growth which in time takes over from the layer of stabilised soil.

In the abovementioned British Patent the term "oil extended rubber" is used to mean the product obtained by mixing natural or synthetic rubber latex with a compatible oil such that the oil is absorbed by the rubber. The soil treatment process described in the patent is not limited to an oil extended rubber produced by a particular mixing, compounding or combining technique. In the worked examples of the abovementioned patent an oil emulsion in water is mixed with the rubber latex to prepare the soil stabilisation composition. The soil stabilisation composition is generally prepared on site just before application to the soil using a locally available source of water so as to avoid the high cost of transporting water across the country. However, it sometimes occurs that there is no locally available source of water so that it has not been possible to use the soil treatment process without incurring excessive expenditure.

We have now found that, surprisingly, a soil stabilisation composition may be prepared by combining the oil, an emulsifier and the rubber latex using no, or only small amounts of, added water.

According to the present invention a process for stabilisation of soil or other particulate matter comprises applying a composition formed from a natural or synthetic rubber latex of solids content at least 40% by weight and a compatible oil and is characterised in that the composition is prepared by admixing the oil and the latex in the presence of additional emulsifier and in the substantial absence of added water.

The oil and the rubber latex may be, for example, any of those referred to in U.K. patent specification No. 1,007,671. However, a natural rubber latex, or a butadiene polymer latex, especially polybutadiene and rubbery styrene-butadiene copolymer (SBR) latices are preferred. Another suitable latex is a styrene-butadiene copolymer latex containing minor amounts of copolymerised unsaturated acid known as carboxylated latex. The styrene content of SBR latices is generally up to 30% by weight. The solids content of available latices is generally in the range 40 to 70% by weight. Preferably the solids content is at least 50% by weight.

It is preferred that the emulsifier added is a non ionic emulsifier. Particularly preferred emulsifiers are alkyl phenol ethylene oxide condensates such as the octyl phenol-ethylene oxide condensate sold by Imperial Chemical Industries, Ltd., of Great Britain (I.C.I.) under the trade name Cirrasol AEN-XZ, and similar materials. Other compatible emulsifiers may be used, for example, anionic emulsifiers. The amount of emulsifier used is generally in the range 0.5 to 10 parts per hundred parts of rubber in the rubber latex.

The preferred mixing technique is to stir the additional emulsifier into the latex and then to mix in the oil using agitation provided by e.g., a mixing pump. Mixing occurs rapidly to form an oil-in-water emulsion or a water-in-oil emulsion or a separable dispersion depending upon the solids content of the latex. No, or only small amounts of, added water are required, by which we mean that the amount of added water can be zero or such as to reduce the final solids content of the soil stabilization composition to no more than 50% addition, i.e., 50:50 total solids (e.g., rubber plus oil):water.

The process can be used with any compatible oil. The preferred oil is a mineral oil, especially aromatic or naphthenic oils. The process is of particular application to crude oils such as obtained directly from the oil well, especially Middle East crude oils. Saudi Arabian crude oil gives very good results, especially when using the aforementioned Cirrasol emulsifier or a similar commercially available product. If desired, a bitumen or asphaltic material may be included. In the context of the present invention the term "bitumen" means a non-crystalline solid or semi-solid cementitious material, derived from petroleum sources, which gradually softens when heated. It consists essentially of compounds composed predominantly of hydrogen and carbon. Bitumens are black or brown in colour and essentially completely soluble in carbon disulphide. Preferably the bitumen is used in the form of an emulsion as described in our U.S. Pat. No. 3,337,987. Preferred characteristics for the bitumen are set out in the aforementioned U.S. Patent.

If desired, prior to application the above described soil stabilisation composition may be diluted with water to enable application by spraying. In such cases addition of water to the concentrated composition, using e.g., a mixing pump, causes inversion of the water-in-oil emulsion to an oil-in-water emulsion. In one embodiment of the invention the concentrated composition or the diluted composition is applied and subsequently, preferably immediately afterwards, is rotovated into the soil to a depth of e.g., 5 cms.

Seeding of the surface prior to treatment with the soil composition is optional depending upon the climatic conditions at the site. The treated area especially after rotovation and rolling is resistant to wind erosion for a considerable period of time.

Ratios of oil to rubber in the composition may be e.g., 5:1 to 20, a ratio of 9:1 (e.g., 400 gallons of crude oil to 60 gallons of latex of about 70% solids content) being very suitable. At these concentrations an application solids content of 50% is preferable, an application rate of 10 liters of composition per sq. meter giving an effective stabilisation of sand.

What we claim is:

1. A process for stabilisation of soil or other particulate matter which comprises applying a composition formed from a natural or synthetic rubber latex, of solids content at least 40% by weight, and a compatible oil characterised in that the composition is prepared by admixing the oil and the latex in the presence of a non ionic surfactant as additional emulsifier and in the substantial absence of added water.

2. A process according to claim 1 wherein the emulsifier is an alkyl phenol ethylene oxide condensate.

3. A process according to claim 1 wherein the emulsifier is used in an amount of 0.5 to 10 parts per hundred parts of rubber in the latex.

4. A process according to claim 1 wherein the bitumen emulsion is included in the composition.

5. A process according to claim 1 wherein the composition is rotovated into the soil or other particulate matter after application.

6. A process according to claim 1 wherein the rubber latex is natural rubber latex.

7. A process according to claim 1 wherein the rubber latex is rubbery styrene-butadiene copolymer latex.

8. A process according to claim 1 wherein the rubber latex is polybutadiene latex.

* * * * *